US010017328B1

(12) United States Patent
Wolf et al.

(10) Patent No.: US 10,017,328 B1
(45) Date of Patent: Jul. 10, 2018

(54) STUB SHAFT CONVEYOR PULLEYS

(71) Applicant: Precision, Inc., Pella, IA (US)

(72) Inventors: Tim Erwin Wolf, Ankeny, IA (US);
Jeffrey Paul Ellis, Altoona, IA (US);
Bruce Randall Terlouw, Pella, IA (US)

(73) Assignee: Precision, Inc., Pella, IA (US)

( * ) Notice: Subject to any disclaimer, the term of this patent is extended or adjusted under 35 U.S.C. 154(b) by 0 days.

(21) Appl. No.: 15/597,945

(22) Filed: May 17, 2017

(51) Int. Cl.
| F16C 13/00 | (2006.01) |
| B65G 39/09 | (2006.01) |
| F16C 19/54 | (2006.01) |

(52) U.S. Cl.
CPC ............ B65G 39/09 (2013.01); F16C 19/547 (2013.01); *F16C 2326/58* (2013.01)

(58) Field of Classification Search
CPC .................................................... B65G 15/08
USPC .............. 198/830, 835, 842; 193/37; 429/16
See application file for complete search history.

(56) References Cited

U.S. PATENT DOCUMENTS

| 3,762,272 | A | * | 10/1973 | Escobedo | ................. | B23C 3/32 |
| | | | | | | 409/200 |
| 3,793,689 | A | | 2/1974 | Specht | | |
| 4,339,158 | A | | 7/1982 | Greener et al. | | |
| 5,022,132 | A | | 6/1991 | Valster et al. | | |
| 5,865,290 | A | | 2/1999 | Scott | | |
| 6,516,942 | B2 | * | 2/2003 | East | ........................ | B65G 39/09 |
| | | | | | | 193/35 R |
| 7,028,825 | B2 | | 4/2006 | Scott | | |
| 8,006,829 | B2 | | 8/2011 | Itoh et al. | | |
| 8,376,128 | B2 | | 2/2013 | Kim | | |
| 8,727,105 | B2 | | 5/2014 | Scott et al. | | |
| 2006/0180426 | A1 | | 8/2006 | Scott | | |
| 2007/0261933 | A1 | | 11/2007 | Scott | | |
| 2011/0240444 | A1 | | 10/2011 | Kim | | |

OTHER PUBLICATIONS

FMC Technologies, "Link-Belt Underground Solutions," pp. 1-28 (2008).
NTN Bower, "Cylindrical and Tapered Roller Bearings," pp. 1-10 (2009).

* cited by examiner

*Primary Examiner* — Gene O Crawford
*Assistant Examiner* — Lester Ill Rushin
(74) *Attorney, Agent, or Firm* — Armstrong Teasdale LLP

(57) ABSTRACT

Stub shaft conveyor pulleys that may be used as a tail pulley and/or head pulley in a belt conveyor system are disclosed. The conveyor pulley includes first and second stub shaft assemblies connected to a center tube. Each stub shaft assembly includes an inner bearing and an outer bearing. In some embodiments, the outer bearing has a diameter larger than the inner bearing. Alternatively or in addition, the inner bearing may be within the center tube and the outer bearing may be exterior to the center tube.

20 Claims, 5 Drawing Sheets

STUB SHAFT CONVEYOR PULLEYS

FIELD OF THE DISCLOSURE

The field of the disclosure relates to stub shaft conveyor pulleys and, in particular, conveyor pulleys that may be used as a tail pulley and/or head pulley in a belt conveyor system.

BACKGROUND

Unit handling operations involve transport of articles over conveyor systems to allow the articles to be processed. When an article is transferred from one conveyor to another, the contour of the head and tail pulleys of the conveyors creates a gap over which the article passes. The articles may shift as the articles pass over this gap. This may allow identifying information of the articles such as barcodes to change their orientation on the conveyor system which may cause the information to not be read. Further, the gap may allow packages to be jammed at the transition region.

The gap between conveyor belts may be reduced by using relatively small-diameter pulleys. Smaller diameter pulleys are generally not suited for use with heavy-rated bearings (e.g., heavy ball bearings) due to the smaller size and load capacity of the bearings. The smaller diameter also limits shaft size, which increases shaft deflection. This often results in frequent pulley failures. Such failures are costly and require significant downtime which is very detrimental in various unit handling operations (e.g., package handling). Bearings which may accommodate shaft deflection (e.g., self-aligning bearings) may be cost prohibitive and/or have limited load capacity.

A need exists for conveyor pulleys that may accommodate higher rated bearings even at a relatively small pulley diameter with reduced shaft deflection. A need also exists for conveyor systems that include such pulleys.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a conveyor pulley. The conveyor pulley includes a center tube having a first end and a second end. The pulley includes first and second stub shaft assemblies. The first stub shaft assembly is connected to the center tube at its first end. The second stub shaft assembly is connected to the center tube at its second end. The first and second stub shaft assemblies each include an inner bearing having a bore diameter and an outer bearing having a bore diameter. The bore diameter of the outer bearing is different than the inner bearing bore diameter. A stub shaft is received in the inner bearing and the outer bearing.

Another aspect of the present disclosure is directed to a conveyor pulley. The pulley includes a center tube having a first end and a second end. The pulley includes first and second stub shaft assemblies. The first stub shaft assembly is partially received in the center tube at its first end. The second stub shaft assembly is partially received in the center tube at its second end. The first and second stub shaft assemblies each include an inboard bearing within the center tube. An outboard bearing is exterior to the center tube. A stub shaft is received in the inboard bearing assembly and the outboard bearing.

Yet a further aspect of the present disclosure is directed to a conveyor pulley. The conveyor pulley includes a center tube having a first end and a second end. The pulley includes first and second stub shaft assemblies. The first stub shaft assembly is connected to the center tube at its first end. The second stub shaft assembly is connected to the center tube at its second end. The first and second stub shaft assemblies each have an outer end and include an outer bearing having an effective load center. There is a distance $D_o$ between the outer end of the stub shaft assembly and the outer bearing effective load center. The first and second stub shaft assemblies each include an inner bearing having an effective load center. There is a distance $D_i$ between the outer bearing effective load center and the inner bearing effective load center. The ratio of $D_i$ to $D_o$ is at least about 1.5:1.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
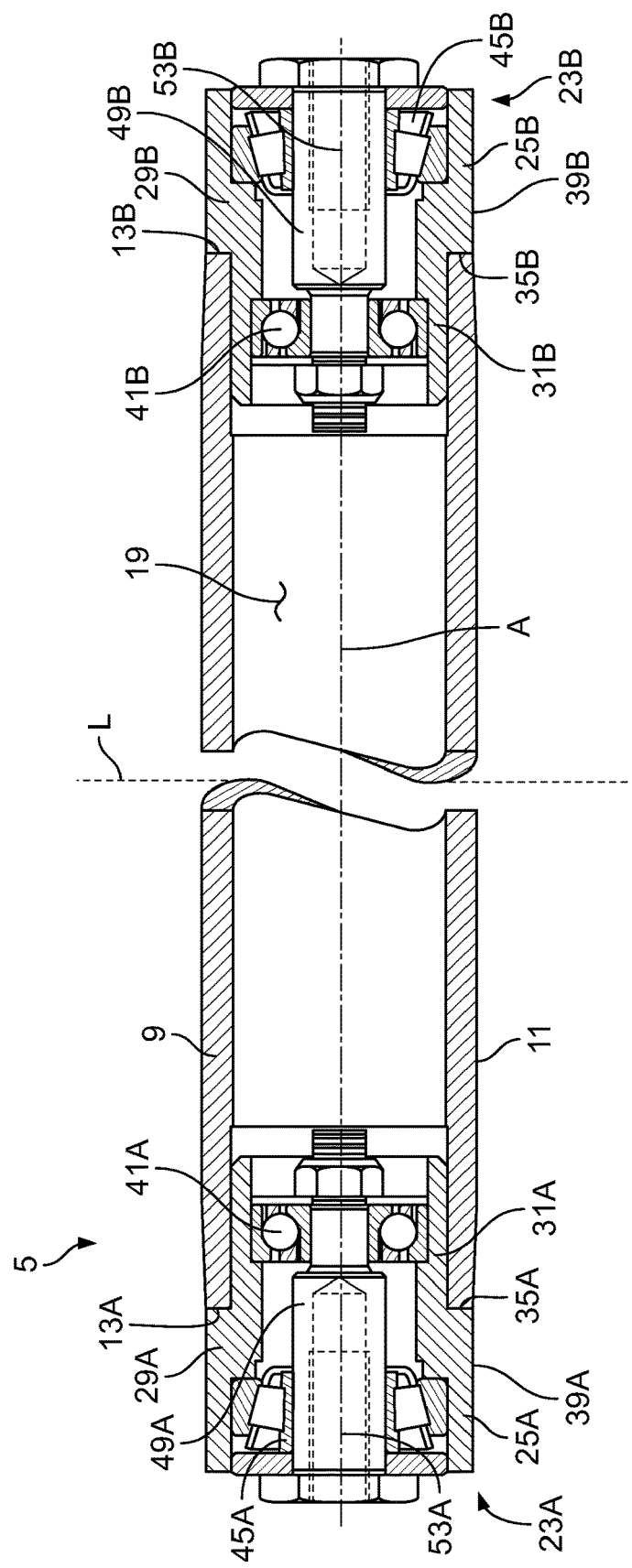
FIG. 1 is a cross-section front view of a conveyor pulley.
Figure 7:
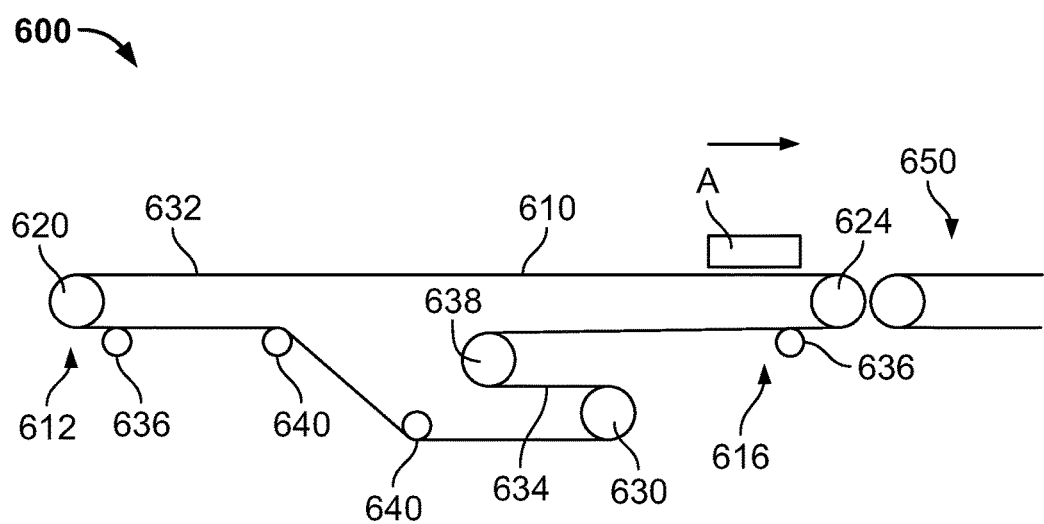
FIG. 7 is a schematic of a conveyor system.

FIG. 1 is a front cross-section view of an example conveyor pulley 5. The conveyor pulley 5 includes a center tube 9 that has a first end 13A and a second end 13B. The center tube 9 defines a center tube chamber 19 within the center tube 9. The center tube 9 has an outer surface 11 which contacts the belt 610 (FIG. 7).

The conveyor pulley 5 is generally longitudinally symmetrical across its width in that several components have a corresponding component with the same function opposite the component (i.e., across a longitudinal mid-plane L). Corresponding components of the pair may be indicated herein by use of a reference number followed by "A" and "B" and may be referred to as a "first" component and a "second" component, respectively. While the conveyor pulley 5 may be described herein with reference to the components of one side of the conveyor pulley 5, any component designated by "A" or "B" herein or shown in FIGS. 1-6 includes a corresponding component with the same function opposite the component.

The conveyor pulley 5 includes a first stub shaft assembly 23A and a second stub shaft assembly 23B. The assemblies 23A, 23B are connected to the center tube 9 at the respective ends 13A, 13B of the center tube 9. As shown, the assemblies 23A, 23B are friction fit into the center tube 9 (e.g., by press-fitting the assemblies 23A, 23B into the center tube 9). In other embodiments, fasteners (not shown) may be used to connect the first and second stub shaft assemblies 23A, 23B to the center tube 9. In other embodiments, the first and second stub shaft assemblies 23A, 23B are welded to the center tube 9 or a threaded joint is used.

In the illustrated embodiment, the first and second stub shaft assemblies 23A, 23B are each partially received within the center tube 9 at its first and second ends 13A, 13B. In other embodiments, the first and second stub shaft assemblies 23A, 23B (and each bearing) are external to the tube 9 (e.g., by welding the assemblies 23A, 23B to the tube 9).

The first stub shaft assembly 23A and second stub shaft assembly 23B each include a stub shaft assembly housing 25A, 25B. Each housing 25A, 25B includes a main body portion 29A, 29B and a stem portion 31A, 31B that extends from the main body portion 29A, 29B. The first stem portion 31A is received in the center tube 9 at the first end 13A of the center tube 9 and the second stem portion 31B is received in the center tube 9 at its second end 13B. Each housing 25A, 25B includes a shoulder 35A, 35B which abuts the center tube 9. Each main body portion 29A, 29B has an outer, belt-engaging surface 39A, 39B. The main body portions 29A, 29B have an outer diameter with the outer diameters being substantially the same as the outer diameter of the center tube 9. Together, the belt engaging surfaces 39A, 39B and outside surface 11 of the center tube 9 form contact surfaces which engage the belt 610 (FIG. 7) as the pulley 5 rotates.

Each stub shaft assembly 23A, 23B includes an inboard bearing 41A, 41B and an outboard bearing 45A, 45B (which may be referred to herein as an "inner" bearing 41A, 41B and "outer" bearing 45A, 45B, respectively). Both inboard bearings 41A, 41B are within the center tube 9 (i.e., within the chamber 19 formed by the center tube 9). Both outboard bearings 45A, 45B are exterior to the center tube 9. In other embodiments, both the inner bearings 41A, 41B and outer bearings 45A, 45B are within the center tube 9. In yet other embodiments, both the inner bearings 41A, 41B and outer bearings 45A, 45B are exterior to the center tube 9.

The first stub shaft assembly 23A includes a first stub shaft 49A that extends through the outboard bearing 45A and the inboard bearing 41A. The second stub shaft assembly 23B includes a second stub shaft 49B that extends through the outboard bearing 45B and inboard bearing 41B. Generally, the stub shafts 49A, 49B are distinct and are not connected to one another (i.e., are not connected as with a full length through-shaft).

The stub shafts 49A, 49B are connectable to a conveyor frame (not shown). Any method to connect the pulley 5 to the frame may be used unless stated otherwise. As illustrated, each shaft 49A, 49B includes a threaded bore 53A, 53B which may receive a fastener (not shown) to attach the shaft to the conveyor frame. In other embodiments, the conveyor pulley 5 is attached to the frame by dropping the roller into a frame slot or other brackets are used to mimic the mounted bearing housings.

A rotational axis A extends through the center tube 9 and the first and second stub shafts 49A, 49B. The center tube 9 and first and second stub shaft assembly housings 25A, 25B rotate about the rotational axis A. The stub shafts 25A, 25B are stationary. Once the belt 610 (FIG. 7) is caused to rotate, the belt 610, which is in contact with the outer surface 11 of the tube 9 and belt-engaging surfaces 39A, 39B, causes the tube 9 and housings 25A, 25B to rotate around the stub shafts 49A, 49B.

Figure 2:
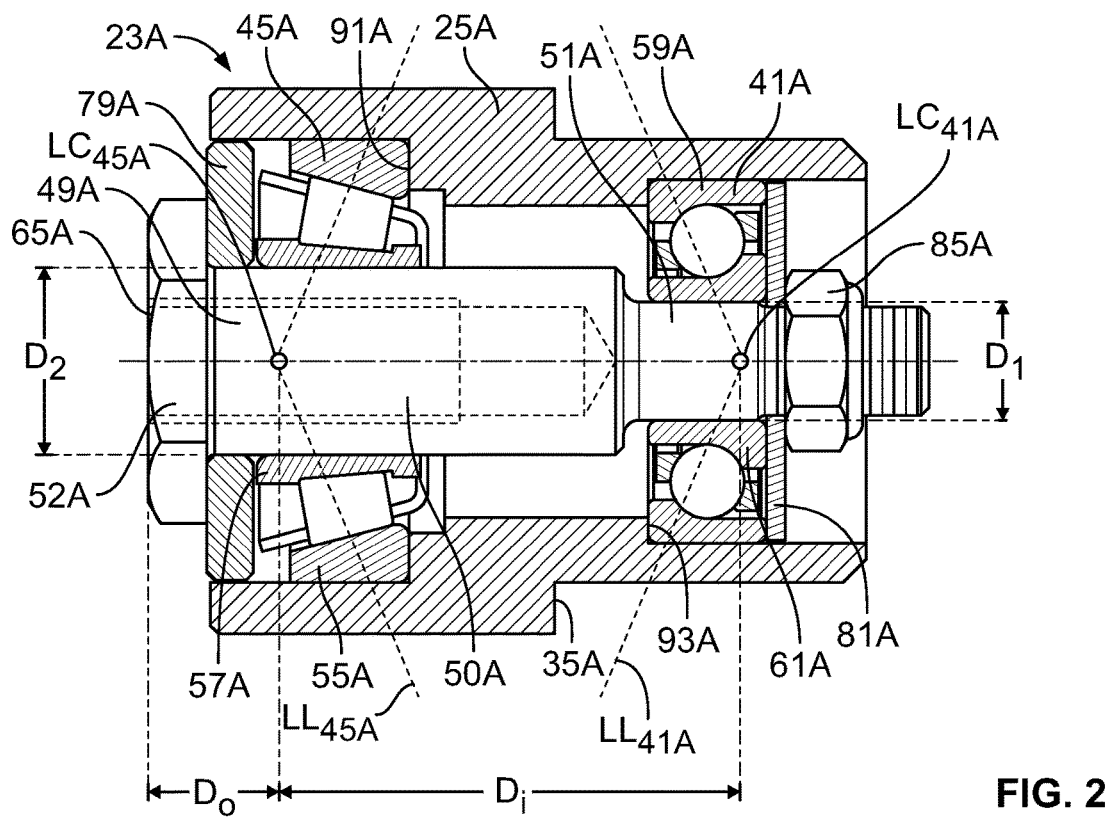
FIG. 2 is a cross-section front view of the stub shaft assembly of the conveyor pulley.

A cross-section front view of the first stub shaft assembly 23A is shown in FIG. 2. The inboard bearing 41A has a bore diameter D1 and the outboard bearing 45A has a bore diameter D2. The bore diameter D2 of the outboard bearing 45A is different than the bore diameter D1 of the inboard bearing 41A. As shown in FIGS. 1-6, the outboard bearing bore diameter D2 is greater than the inboard bearing bore diameter D1.

The stub shaft 49A includes a main body portion 50A and a reduced diameter portion 51A that extends from the main body portion 50A. The stub shaft 49A also includes a collar 52A which is seated against an outer seal plate 79A. The main body portion 50A of the stub shaft 49A extends through the outboard bearing 45A and the reduced diameter portion 51A extends through the inboard bearing 41A.

The outboard bearing 45A includes an outer raceway 55A and an inner raceway 57A. The inboard bearing 41A also includes an outer raceway 59A and an inner raceway 61A. In some embodiments, the outer raceway 55A of the outboard bearing 45A has an outer diameter that is greater than the inner diameter of the center tube 9.

The inboard bearing 41A and/or outboard bearing 45A may be an angular contact bearing. In the illustrated embodiment, the inboard bearing 41A is an angular contact ball bearing and the outboard bearing 45A is a tapered roller bearing. In other embodiments (e.g., FIGS. 4-6), both the outboard bearings 45A, 45B and inboard bearings 41A, 41B are tapered roller bearings. In less preferred embodiments, the inboard and/or outboard bearing may be a ball bearing (e.g., non-angular contact), cylindrical bearing, roller bearing (e.g., non-tapering), needle bearing, or spherical bearing.

As shown in FIG. 2, the angular contact ball bearing 41A is configured such that the load line $LL_{41A}$ that joins the points of contact of the ball and the raceways in the radial plane flares inward as it moves toward the longitudinal mid-plane L (FIG. 1) of the pulley (i.e., has an effective load center shifted toward the longitudinal mid-plane L). The rollers of the outboard bearing 45A taper inward as they progress toward the longitudinal mid-plane L of the pulley (i.e., the load line $LL_{45A}$ flares outward as it moves toward the longitudinal mid-plane L of the pulley with an effective load center shifted away from the longitudinal mid-plane L).

In other embodiments, the load line $LL_{41A}$ of the inboard bearing 41A tapers outward as it progress toward the longitudinal mid-plane L of the pulley and/or the load line $LL_{45A}$ of the outboard pulley flares inward as it moves toward the longitudinal mid-plane L of the pulley.

The inboard bearing 41A and outboard bearing 45A each has an effective load center $LC_{41A}$, $LC_{45A}$ where the load lines converge along the bearing axis. The position of the effective load center may be determined by conventional methods (e.g., by use of the raceway contact angles) or by published information provided by the bearing manufacturer.

The axial position of the effective load center of angular contact bearings generally does not correspond to the geometric center plane of the bearing (i.e., the mid-point of the rolling elements such as the balls or rollers). Generally, the axial position of the effective load center of non-angular contact bearings corresponds to the geometric center plane of the rolling element.

The effective load center of the inboard bearing 41A is represented by "$LC_{41A}$" in FIG. 2 and the effective load center of the outboard bearing 45A is represented by "$LC_{45A}$". The first stub shaft assembly 23A has an outer end 65A, generally near where the load is transmitted to the frame. There is a distance $D_o$ between the outer end 65A of the stub shaft assembly 23A and the outboard bearing effective load center $LC_{45A}$. There is also a distance $D_i$ between the inboard bearing effective load center $LC_{41A}$ and the outboard bearing effective load center $LC_{45A}$. In some embodiments, the ratio of $D_i$ to $D_o$ is at least about 1.5:1 or even at least about 2:1 or even at least about 3:1 or more. In some embodiments, the ratio of $D_i$ to $D_o$ is from about 1.5:1 to about 7.5:1, from about 2:1 to about 7.5:1, from about 3:1 to about 7.5:1, or about 4:1.

In some embodiments, the center tube 9 has a relatively small diameter, such as typical of pulleys used in unit handling operations. For example, the center tube 9 may have an outer diameter of less than about 4 inches, or even less than about 3.5 inches, less than about 3 inches, less than about 2.5 inches or less than about 2 inches.

The stub shaft assembly 23A includes an outer seal plate 79A and an inner seal plate 81A. The outer seal plate 79A and the inner seal plate 81A seal lubricant within the stub shaft assembly 23A. The housing 25A is secured to the shaft 49A by fastener 85A. As illustrated, fastener 85A is a nut that threads onto a threaded portion of the shaft 49A. In other embodiments, the fastener 85A may be a clamp ring, retaining ring, push nut or other fastener. The housing 25A includes an outer shoulder 91A (FIG. 2) and an inner shoulder 93A with the outboard bearing 45A being seated against the outer shoulder 91A and the inboard bearing 41A being seated against the inner shoulder 93A.

The center tube 9 is counter-bored to include two outer sections (one outer section 87A being shown in FIG. 3) and an inner section 83 with the outer sections having a larger inner diameter than the inner section. The counter-bored outer sections 87A, 87B may be formed by machining the inside surface of a tube that has been cut to the length of the center tube 9. The outer section 87A and inner section 83 may form a shoulder 89A which acts as a stop while positioning the stub shaft assembly 23A into the tube 9. In other embodiments such as the illustrated embodiments, the center tube 9 acts as a stop during assembly (i.e., the assemblies 23A, 23B are inserted into the housing shoulders 35A, 35B abut the center tube 9).

Figure 3:
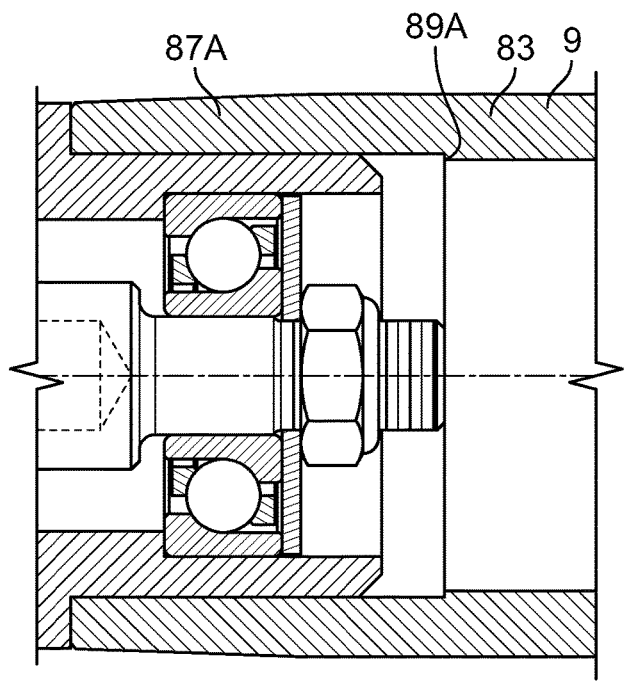
FIG. 3 is a detailed cross-section front view of the conveyor pulley.
Figure 4:
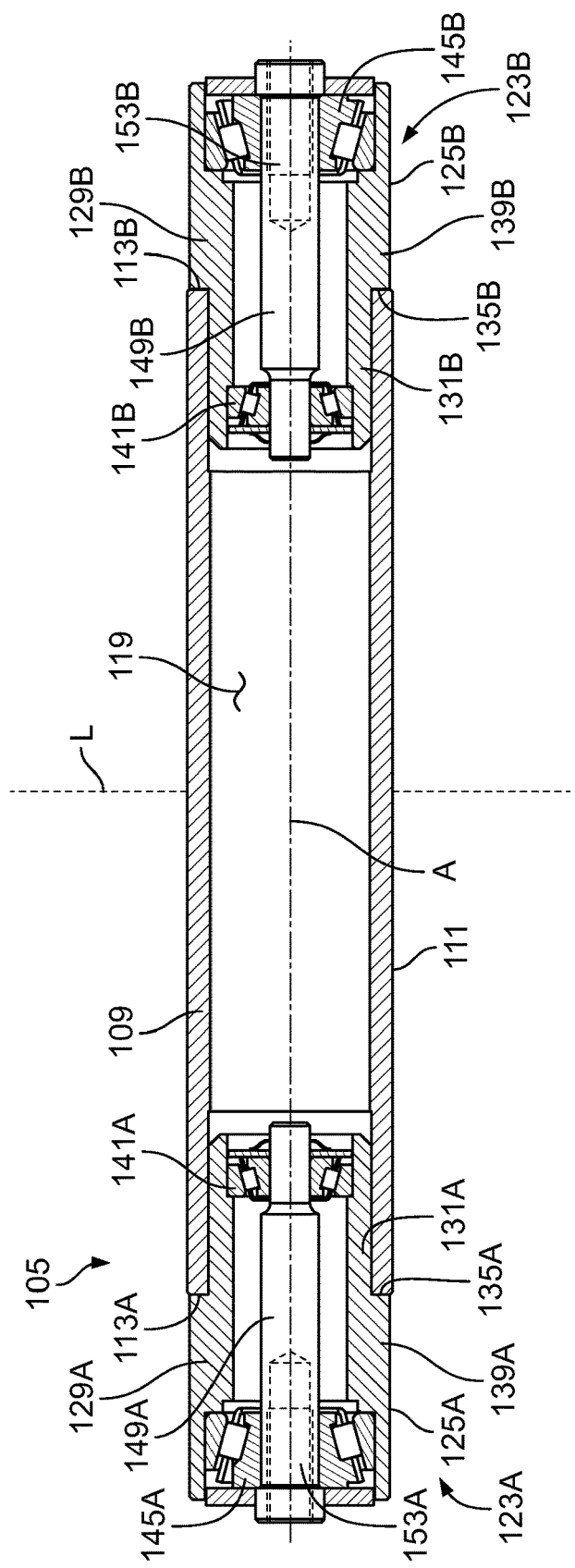
FIG. 4 is a cross-section front view of another embodiment of a conveyor pulley.
Figure 5:
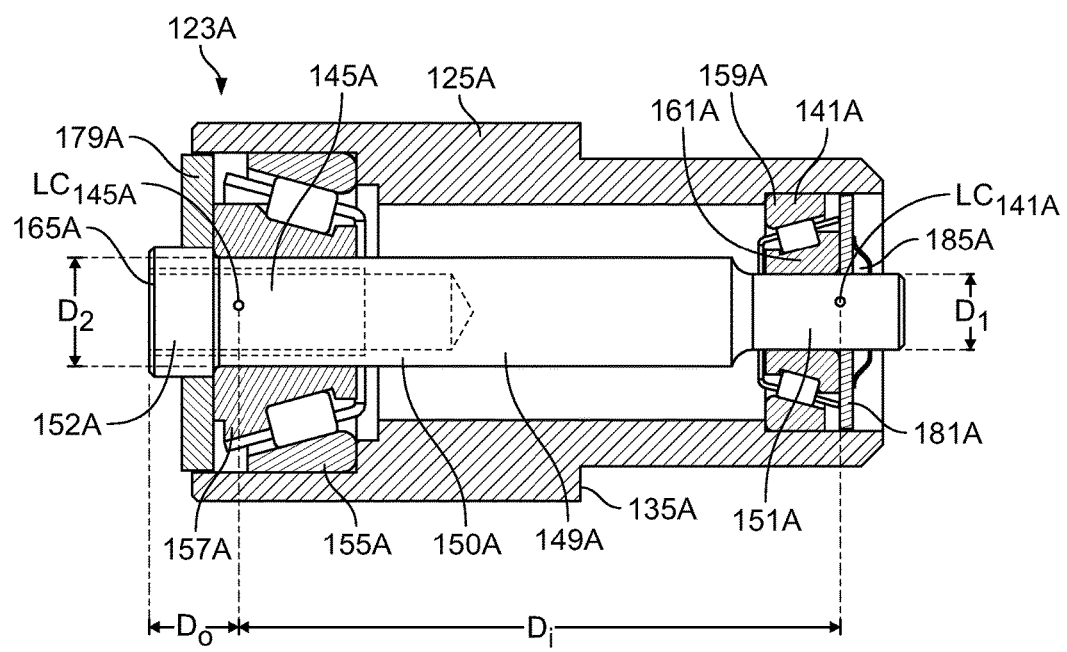
FIG. 5 is a cross-section front view of the stub shaft assembly of the conveyor pulley of FIG. 4.
Figure 6:
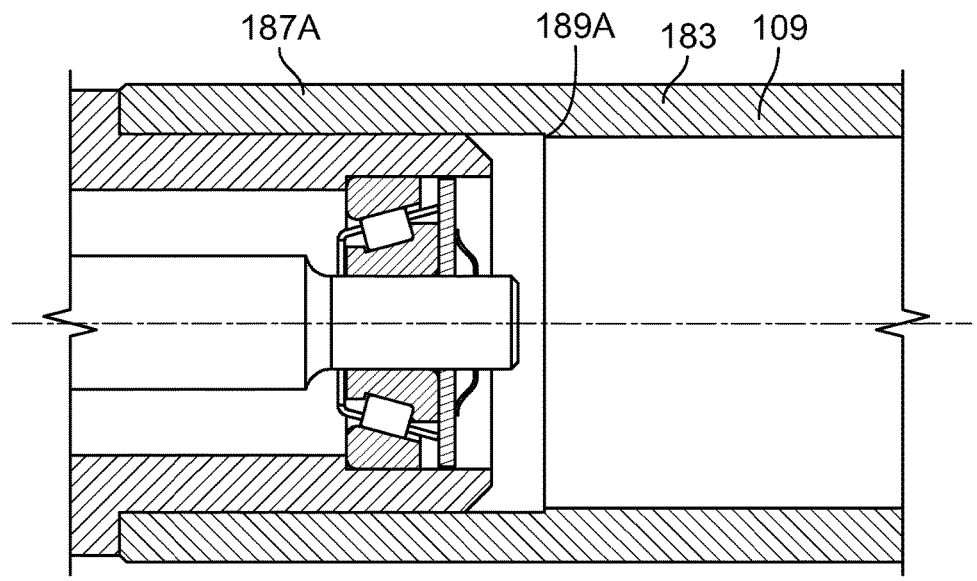
FIG. 6 is a detailed cross-section front view of the conveyor pulley.

Another embodiment of a conveyor pulley 105 is shown in FIGS. 4-6. The components shown in FIGS. 4-6 that are analogous to those of FIGS. 1-3 are designated by the corresponding reference number of FIGS. 1-3 plus "100" (e.g., part 41 becomes 141). The conveyor pulley 105 includes a first stub shaft assembly 123A and a second stub shaft assembly 123B. Each stub shaft assembly 123A, 123B includes an inboard bearing 141A, 141B and an outboard bearing 145A, 145B (which may be referred to as "inner" and "outer" bearings). In the embodiment illustrated in FIGS. 4-6, the outboard bearings 145A, 145B and the inboard bearings 141A, 141B are tapered roller bearings.

With reference to FIG. 5, the stub shaft assembly 123A includes a push nut 185A to secure the stub shaft assembly housing 125A to the stub-shaft 149A.

FIG. 7 shows an example belt conveyor system 600 for moving articles A in which embodiments of the conveyor pulley 5, 105 may be used. The conveyor belt system 600 includes a tail section 612 at which articles are loaded on the conveyor belt 610 and a head section 616 in which articles are discharged from the conveyor belt 610. The tail section 612 includes a tail pulley 620 around which a conveyor belt 610 is looped. The head section 616 includes a head pulley 624 around which the conveyor belt 610 is looped. The conveyor belt 610 supports the articles A and rotates around the tail pulley 620 and head pulley 624. The articles A are supported on an outer surface 632 of the conveyor belt 610. An inner surface 634 of the conveyor belt 610 contacts the tail pulley 620 and the head pulley 624.

The conveyor pulley 5, 105 (FIGS. 1-6) of embodiments of the present disclosure described above is the tail pulley 620 or the head pulley 624 of the belt conveyor system 600. In some embodiments, the conveyor pulley 5, 105 of embodiments of the present disclosure described above is both the tail pulley 620 and the head pulley 624.

The system 600 includes a drive pulley 630 to cause rotation of the conveyor belt 610. In other embodiments, the drive pulley may be the head pulley 624 of the system (e.g., such as in processing of bulk material) and the tail pulley 620 is an embodiment of the pulley 5, 105 (FIGS. 1-6) described above. The system 600 includes snub pulleys 636 to increase the contact angle of the belt 610 near the tail and head pulleys 620, 624. The system 600 includes a take-up pulley 638 to maintain tension on the belt 610 and bend pulleys 640 to change the direction of the belt 610. The system 600 may also include idler rollers (not shown) between the head pulley 624 and tail pulley 620 for supporting the weight of the belt 610 and articles. In some embodiments, the conveyor pulley 5, 105 of embodiments the present disclosure is not an idler roller (i.e., the pulley causes the belt to change direction).

In this regard, the system of FIG. 7 is an example and other arrangements of pulleys (e.g., re-arrangement, addition or elimination of drive, snub, bend and/or take-up pulleys) may be used without limitation unless stated otherwise. In some embodiments, the system 600 also includes an upstream conveyor (not shown) or downstream conveyor 650, such as a conveyor that is adapted to receive articles directly from the conveyor belt 610. It should also be understood that the conveyor system 600 is shown for illustration and is not drawn to scale.

Generally, the conveyor system 600 may transport any article A such as articles processed in unit handling operations including, for example, packages that are shipped (e.g., items containing a barcode). In other embodiments, the articles are bulk items (e.g., food, grain, mining materials or the like).

The conveyor system 600 of FIG. 7 described above may be used in various methods for transporting articles. According to several embodiments, articles are loaded onto the outer surface 632 of the conveyor belt 610 at the tail section 612. The tail pulley 620 and head pulley 624 are caused to rotate (e.g., by drive pulley 630) to rotate the conveyor belt and to cause articles to travel from the tail section 612 to the head section 616 of the belt conveyor system 600. Articles are discharged from the conveyor belt 610 at the head section 616 (e.g., onto a downstream conveyor 650).

Compared to conventional conveyor pulleys, the conveyor pulleys of embodiments of the present disclosure have several advantages. By positioning the outboard bearing external to the center tube, a larger outboard bearing (e.g., having an outer raceway diameter greater than the diameter of the center tube) may be used while keeping the diameter of the pulley relatively small. Such relatively small diameter pulleys are useful in unit handling applications as they reduce the gap between the pulleys to facilitate transfer of articles from one conveyor to the next conveyor. By reducing the gap between pulleys, the articles maintain their orientation on the various conveyor belts during transfer between belts (e.g., to allow identifying information such as barcodes to maintain their orientation to allow the information to be read). By using an inboard bearing smaller than the outboard bearing, the inboard bearing may be within the center tube which keeps attachment of the tube to the housing as close to the end of the pulley which reduces the bending moment load. By using stub shafts, shaft deflection is reduced which allows higher rated, more readily available (e.g., reduced cost) bearings, such as tapered bearings, to be used to increase the lifetime of the pulley.

In embodiments in which the ratio between the distance between the respective effective load centers of the inboard bearing and outboard bearing ($D_i$) and the distance between the end of the stub shaft and the effective load center of the outboard bearing ($D_o$) is at least about 1.5:1 or even at least about 2:1 or at least about 3:1 (e.g., about 4:1), the load on the outboard bearing is reduced which allows a smaller outboard bearing to be used. In embodiments in which the ratio between the respective distances ($D_i/D_o$) is less than about 7.5:1, less than about 6:1 or even less than about 5:1 (e.g., about 4:1) the amount of shaft deflection is reduced which allows higher rated bearings such as tapered bearings to be used.

In embodiments in which the center tube 9 is machined to create two counter-bores, the stub shaft assemblies may more securely fit within the center tube. In embodiments in which the shafts are attached to the stub shaft assemblies by a threaded nut, variability in tolerances is reduced (e.g., relative to clamping rings) which helps set the proper clearance for the bearings.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A conveyor pulley comprising:
   a center tube having a first end and a second end;
   a first stub shaft assembly, the first stub shaft assembly being connected to the center tube at its first end; and
   a second stub shaft assembly, the second stub shaft assembly being connected to the center tube at its second end, the first and second stub shaft assemblies each comprising:
   an inner bearing, the inner bearing being an angular contact bearing and having a bore diameter and having a load rating;
   an outer bearing, the outer bearing being an angular contact bearing and having a bore diameter different than the inner bearing bore diameter, the outer bearing having a load rating greater than the load rating of the inner bearing; and
   a stub shaft received in the inner bearing and the outer bearing.

2. The conveyor pulley as set forth in claim 1 wherein the outer bearing bore diameter is greater than the inner bearing bore diameter.

3. The conveyor pulley as set forth in claim 1 wherein the inner bearing is within the center tube and the outer bearing is exterior to the center tube.

4. The conveyor pulley as set forth in claim 3 wherein the outer bearing comprises an outer raceway having an outer diameter and the center tube has an inner diameter, the outer diameter of the outer raceway being greater than the inner diameter of the center tube.

5. The conveyor pulley as set forth in claim 1 wherein the first and second stub shaft assemblies each comprise a stub shaft assembly housing, the housing comprising:
   a main body portion having an outer, belt-engaging surface; and
   a stem portion that extends from the main body portion that is received in the center tube.

6. The conveyor pulley as set forth in claim 5 wherein the main body portion of the stub shaft assembly has an outer diameter, the outer diameter being the same as the diameter of the center tube.

7. The conveyor pulley as set forth in claim 1 wherein each stub shaft comprises main body portion and a reduced diameter portion that extends from the main body, the main body portion being received in the outer bearing and the reduced diameter portion being received in the inner bearing.

8. The conveyor pulley as set forth in claim 1 wherein each of the inner bearing and outer bearing is selected from the group consisting of a roller bearing, ball bearing, cylindrical bearing, needle bearing, and spherical bearing.

9. The conveyor pulley as set forth in claim 1 wherein the outer bearing comprises an inner raceway, the inner raceway contacting the stub shaft.

10. The conveyor pulley as set forth in claim 1 wherein the outer bearing is a tapered roller bearing.

11. The conveyor pulley as set forth in claim 1 wherein the conveyor pulley is free from powered rotation and the center tube has a diameter of less than 4 inches.

12. A belt conveyor system for moving articles, the conveyor system comprising:
   a conveyor belt;
   a tail section at which articles are loaded onto the conveyor belt, the tail section including a tail pulley around which the conveyer belt is looped; and
   a head section at which articles are discharged from the conveyor belt, the head section including a head pulley around which the conveyor belt is looped, the conveyor pulley of claim 1 being the tail pulley or head pulley.

13. A conveyor pulley comprising:
   a center tube having a first end and a second end;
   a first stub shaft assembly, the first stub shaft assembly being connected to the center tube at its first end; and
   a second stub shaft assembly, the second stub shaft assembly being connected to the center tube at its second end, the first and second stub shaft assemblies each having an outer end and each comprising:
   an outer bearing having an effective load center, there being a distance $D_o$ between the outer end of the stub shaft assembly and the outer bearing effective load center, an inner bearing having an effective load center, there being a distance $D_i$ between the outer bearing effective load center and the inner bearing effective load center, the ratio of $D_i$ to $D_o$ being at least about 1.5:1.

14. The conveyor pulley as set forth in claim 13 wherein the inner bearing and outer bearing are each selected from the group consisting of a roller bearing, ball bearing, cylindrical bearing, needle bearing, and spherical bearing.

15. The conveyor pulley as set forth in claim 13 wherein the inner bearing and outer bearing is each an angular contact bearing.

16. A conveyor pulley comprising:
a center tube having a first end and a second end;
a first stub shaft assembly, the first stub shaft assembly being connected to the center tube at its first end; and
a second stub shaft assembly, the second stub shaft assembly being connected to the center tube at its second end, the first and second stub shaft assemblies each comprising:
an inner bearing disposed within the center tube, the inner bearing being an angular contact bearing and having a bore diameter;
an outer bearing disposed exterior to the center tube, the outer bearing being an angular contact bearing and having a bore diameter different than the inner bearing bore diameter; and
a stub shaft received in the inner bearing and the outer bearing.

17. The conveyor pulley as set forth in claim 16 wherein the outer bearing comprises an outer raceway having an outer diameter and the center tube has an inner diameter, the outer diameter of the outer raceway being greater than the inner diameter of the center tube.

18. The conveyor pulley as set forth in claim 16 wherein the first and second stub shaft assemblies each comprise a stub shaft assembly housing, the housing comprising:
a main body portion, the outer bearing being disposed within the main body portion; and
a stem portion that extends from the main body portion that is received in the center tube.

19. The conveyor pulley as set forth in claim 16 wherein the outer bearing comprises an inner raceway, the inner raceway contacting the stub shaft.

20. The conveyor pulley as set forth in claim 16 wherein the conveyor pulley is free from powered rotation and the center tube has a diameter of less than 4 inches.

* * * * *